(12) United States Patent
Fay

(10) Patent No.: US 6,478,188 B1
(45) Date of Patent: Nov. 12, 2002

(54) FILTER DISPENSER

(76) Inventor: James B. Fay, 8220 W. Oaklawn Rd., Biloxi, MS (US) 39532

( * ) Notice: Subject to any disclaimer, the term of this patent is extended or adjusted under 35 U.S.C. 154(b) by 0 days.

(21) Appl. No.: 09/879,406

(22) Filed: Jun. 12, 2001

(51) Int. Cl.⁷ .............................................. B65G 59/00
(52) U.S. Cl. ...................... 221/210; 221/255; 294/1.1
(58) Field of Search ................... 221/210, 213, 221/255, 259; 206/556; 294/1.1

(56) References Cited

U.S. PATENT DOCUMENTS

| | | | | |
|---|---|---|---|---|
| 3,248,006 A | * | 4/1966 | Lowery et al. | 221/210 |
| 4,285,114 A | * | 8/1981 | Underdahl | 221/210 |
| 4,401,233 A | * | 8/1983 | Frey | 221/210 |
| 4,417,670 A | * | 11/1983 | Booher | 221/210 |
| 4,805,801 A | * | 2/1989 | Knopf | 221/210 |
| 4,848,815 A | * | 7/1989 | Molloy | 294/1.1 |
| 4,946,066 A | * | 8/1990 | Teitelman | 221/210 |
| 5,097,984 A | | 3/1992 | Meisner et al. | 221/37 |
| 5,322,190 A | * | 6/1994 | Bartley | 221/210 |

* cited by examiner

Primary Examiner—H. Grant Skaggs
(74) Attorney, Agent, or Firm—Richard D. Fuerle

(57) ABSTRACT

A filter dispenser is disclosed. The dispenser comprises a filter holder for horizontally holding a multiplicity of nested filters, an extractor positioned above the filter holder having a tacky material on its lower surface, and a resilient bridge connecting the extractor to the filter holder, whereby when the extractor is pressed downward the resilient bridge is bent until the tacky material contacts the uppermost of the filters, and, when released, returns to its original position with the uppermost filter attached to the tacky material.

Also disclosed is a method of dispensing filters using the filter dispenser. The extractor is pressed downward until the tacky material contacts the uppermost filter in the stack. The extractor is permitted to return to its original position with the uppermost filter adhering to the tacky material and the uppermost filter is removed from the tacky material.

14 Claims, 5 Drawing Sheets

FILTER DISPENSER

BACKGROUND OF THE INVENTION

This invention relates to a dispenser for separating a single filter from a stack of nested filters and raising the separated filter to an easily accessible position. In particular, it relates to a dispenser having a sticky extractor that lifts a filter so that it can be grasped.

Coffee filters are sold in tightly-packed stacks that must be kneaded and worked to separate the filters from each other. Often, when attempting to obtain a single filter, several filters stick together and the extra filters must either be put back or discarded, causing unnecessary waste and inconvenience.

A number of devices have been invented to separate coffee filters so that a single filter can be accessed. One such device is shown in U.S. Pat. No. 5,097,984. In that device, a stack of filters is placed in a container that is completely enclosed. A person desiring a single filter presses a plunger mounted in the hinged top of the container, which drives down a spring-mounted shaft that is attached to the plunger. An adhesive material at the bottom of the shaft presses against the uppermost filter in the stack. When the plunger is released, the shaft rises up slightly with a filter attached to the adhesive material. However, the filter is still not accessible because it is still inside a closed container. The hinged top of the container must be raised in order to grasp and remove the filter.

SUMMARY OF THE INVENTION

I have invented a coffee filter dispenser that will separate a single filter from a nested stack of filters and immediately present the filter so that it can be grasped and removed.

Unlike some other coffee filter dispensers, the coffee filter dispenser of this invention does not separate into two or more parts when dispensing filters. Instead, it remains a single, unitary construction.

A further advantage of the coffee filter dispenser of this invention is that it presents the filter dispensed at an angle tilted towards the user, so that it can be more easily grasped and removed.

DESCRIPTION OF THE PREFERRED EMBODIMENTS

Figure 1:
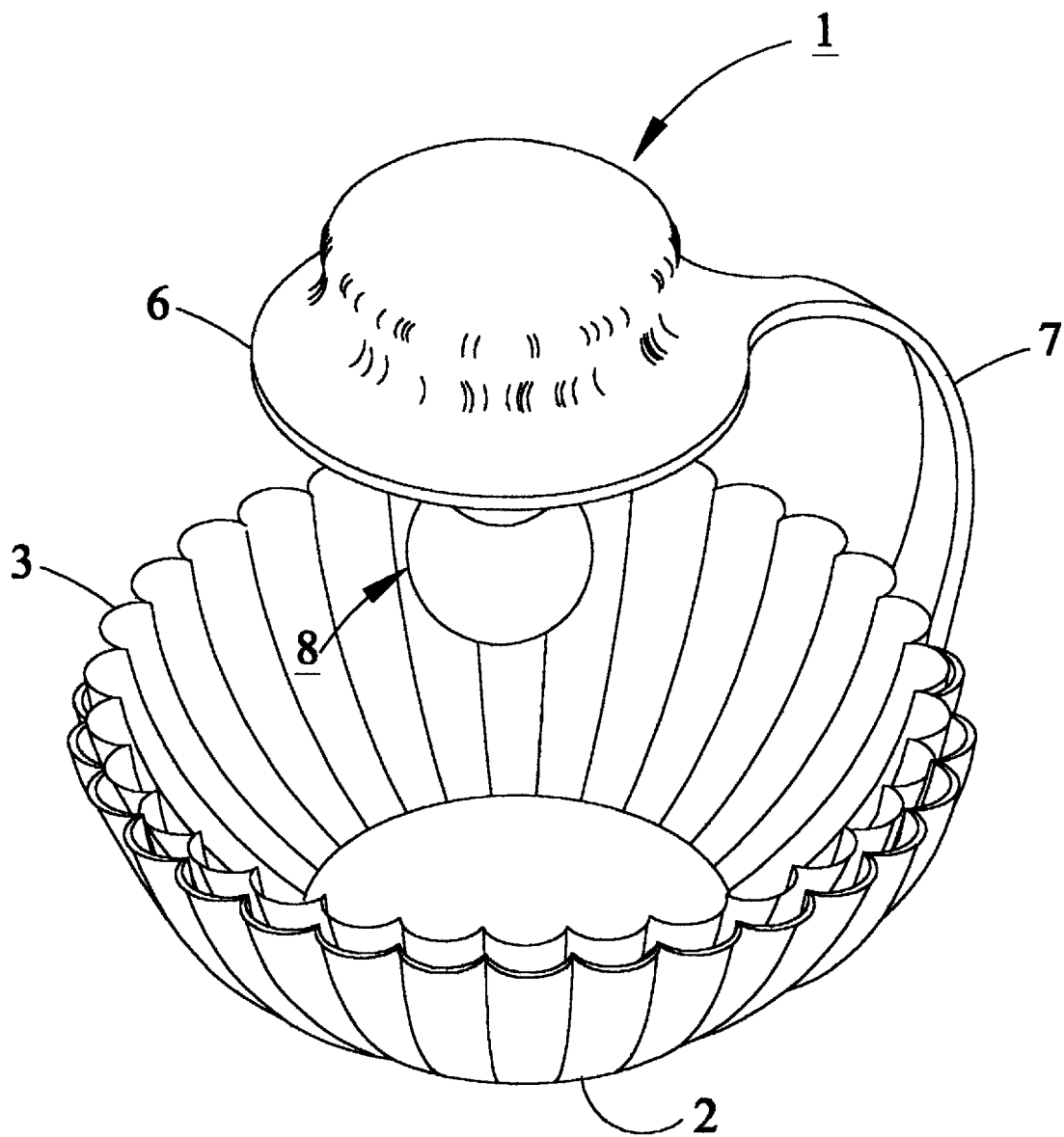
FIG. 1 is a 45° downward isometric view showing a certain presently preferred embodiment of a coffee filter dispenser according to this invention in its resting position.
Figure 2:
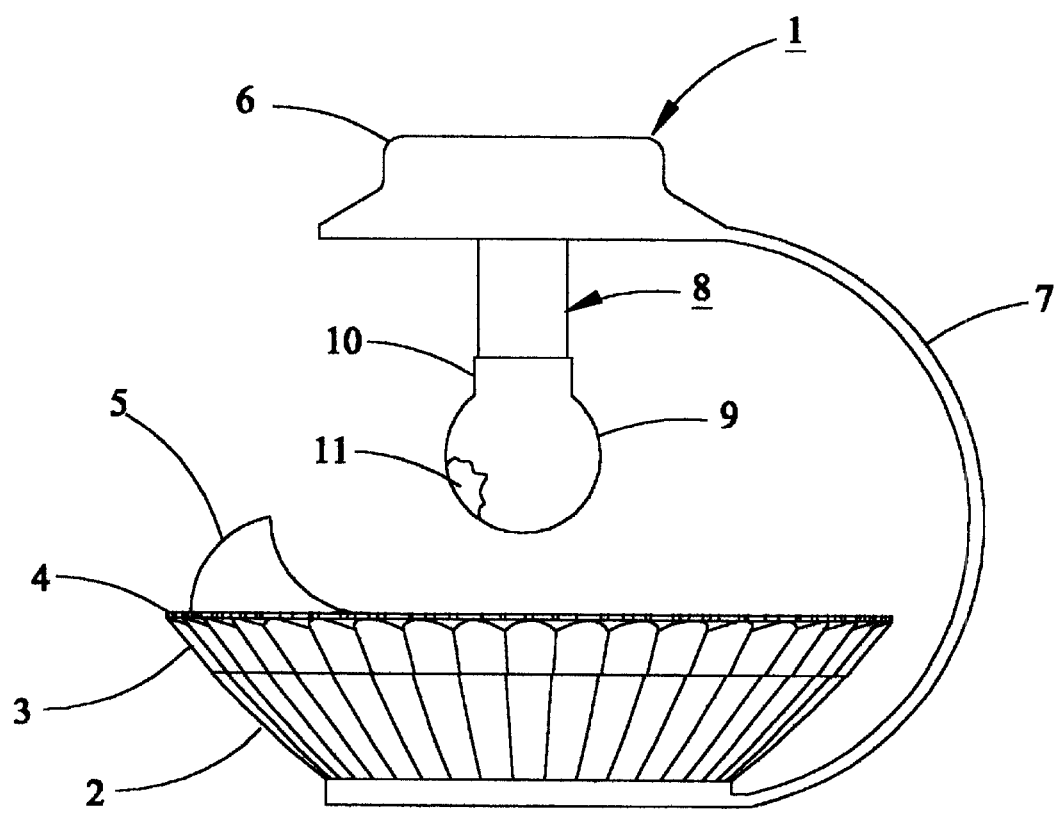
FIG. 2 is a view of the coffee filter dispenser of FIG. 1 in its resting position, also showing an optional filter cover.

In FIGS. 1 to 4, dispenser 1 has a filter holder 2 which holds a stack 3 of filters. In FIG. 2 only, an optional filter cover 4 fits over filter holder 2 to keep the filters clean; a vertical tab 5 on filter cover 4 permits its easy removal. Bridging filter holder 2 and support 6 is resilient handle 7. To support 6 is attached filter extractor 8, consisting of a rounded portion 9 and a collar 10. The bottom of rounded portion 9 is coated with tacky material 11. Tacky material 11 is preferably off-center on the bottom of rounded portion 9, on the side of extractor 8 opposite a resilient handle 7, so that it covers that part of rounded portion 9 that contacts a filter.

Filter holder 2, support 6, and resilient handle 7 are preferably a single unit, such as for example, rubber, spring steel, rubber-coated spring steel, molded plastic, or stainless steel; rubber is preferred. Alternatively, filter holder 2, support 6, and resilient handle 7 can be separate pieces that are fastened together by snapping, screws, bolts, or other means well-known in the art. Resilient handle 7 is preferably flat, as shown in the drawings, but other shapes of resilient materials can also be used.

Figure 3:
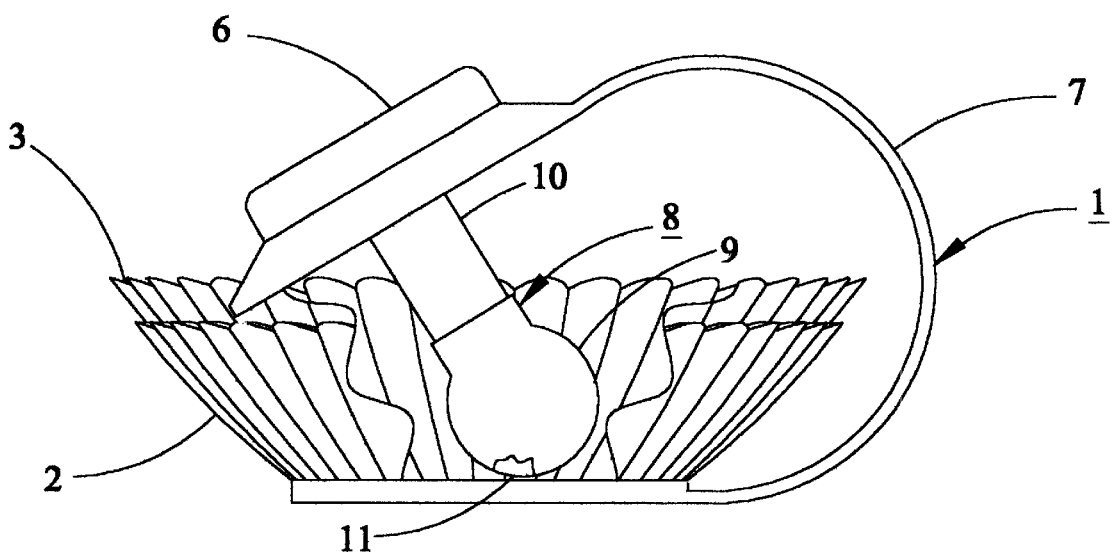
FIG. 3 is a side view, partially cutaway, of the coffee filter dispenser of FIG. 1 in its position for picking up a filter.
Figure 4:
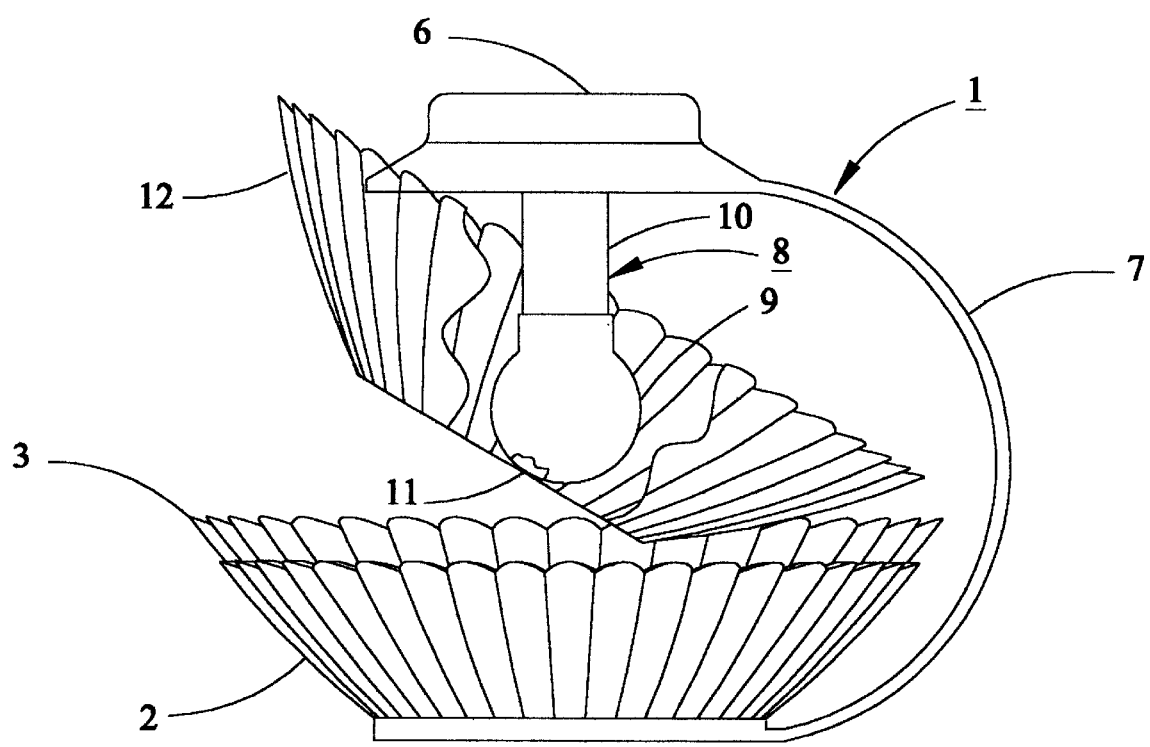
FIG. 4 is a side view, partially cutaway, of the coffee filter dispenser of FIG. 1 in its resting position after picking up a filter.

To obtain a single filter from stack 3, one pushes down on support 6, bending resilient handle 7 until tacky material 11 on filter extractor 8 contacts the uppermost filter in stack 3, as shown in FIG. 3. One then ceases to press on support 6, allowing resilient handle 7 to return to its original or resting position with a single filter 12 attached, as shown in FIG. 4.

To lift the filters in a balanced position to prevent them from coming off filter extractor 8 before they are intentionally removed, filter holder 2 is preferably of the same shape and size as the filters it is to hold and is positioned so that filter extractor 8 presses against the center of the filters. Also, for aesthetic reasons, filter holder 2 can be designed so that it has the same outward appearance as the filters, as shown in the drawings. While the filters will usually be made or natural or synthetic paper and will be round with upturned edges, they can also be made of other materials and have other shapes. They can also be stacked in an upside-down position on a similarly shaped support (not shown), if desired.

Figure 5:
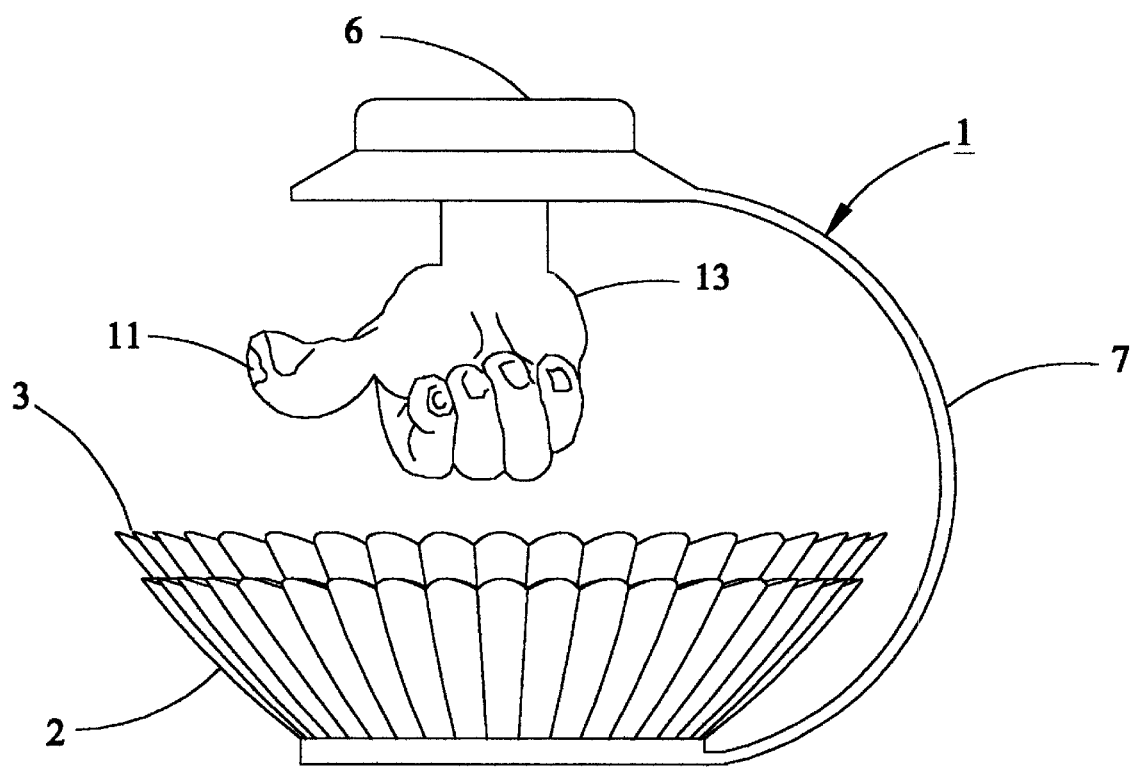
FIG. 5 is a side view of an alternative coffee filter dispenser according to this invention is its resting position.

The filter extractor can have various shapes in addition to the plain ball shape shown in the drawings. For example, it could look like a basketball, soccer ball, tennis ball, volleyball, baseball, or golf ball. FIG. 5 shows a coffee filter dispenser similar to the dispenser of FIGS. 1 to 4, except that extractor 13 is in the shape of a fist with an extended thumb. The filter extractor is preferably rounded on the bottom so that it does not pierce the filters. It can be made from a light weight plastic, similar to a ping pong ball, which is molded as a single unit with collar 9. The filter extractor can also be made of other materials, such as wood or metal. The filter extractor is preferably removably attached to support 6 by threads, bolts, or other means, so that it can be detached from support 6 for cleaning, replacement, or to re-apply tacky material 11.

Tacky material 11 must be sufficiently tacky or sticky so that a filter will adhere to it and separate from the remaining filters in the stack, but tacky material 11 should not come off onto the filter. Materials such as double-sided tape, partially dried glue, and low molecular weight polymers (such as used in "Post-It" note paper), can be used for this purpose, but a non-toxic, water-soluble glue sold as "Aleene's Tack It Over & Over," by Duncan Enterprises is preferred because it is commercially available and remains tacky for a long time; additional tacky material 11 can be applied to the bottom of the filter extractor as needed.

I claim:
1. A coffee filter dispenser comprising
 (A) a single piece comprising
  (1) a cup-shaped filter holder for horizontally holding a multiplicity of nested filters;
  (2) a support positioned above said filter holder; and

(3) a single resilient bridge connecting said support to said filter holder;

(B) a detachable extractor connected to the bottom of said support and having a round bottom; and (C) a tacky material off-center on said round bottom, opposite said resilient bridge, whereby when said support is pressed downward said resilient bridge is bent until said tacky material contacts the uppermost of said filters and, when said support is no longer pressed downward, said extractor returns to its original position.

2. A dispenser according to claim 1 wherein said extractor is ball-shaped.

3. A dispenser according to claim 1 wherein said tacky material is permanently tacky and will not come off onto a filter.

4. A dispenser according to claim 1 wherein said tacky material is a non-toxic, water-soluble glue.

5. A dispenser according to claim 1 wherein said extractor is higher than the top of said nested filters.

6. A dispenser according to claim 1 including a filter cover that fits over said nested filters.

7. A dispenser according to claim 1 wherein said filter holder has the same shape as said filters.

8. A dispenser according to claim 1 wherein said resilient bridges a single flat beam.

9. A dispenser according to claim 1, wherein said resilient bridge is made of rubber.

10. A dispenser according to claim 1 wherein said resilient bridge is made of spring steel.

11. A dispenser according to claim 1 wherein said resilient bridge is made of plastic.

12. A coffee filter dispenser according to claim 1 wherein said single unit is made of rubber.

13. A coffee filter dispenser according to claim 1 wherein said tacky material is a non-toxic, water-soluble glue.

14. A method of dispensing filters using a filter dispenser according to claim 1 comprising (A) pressing said support downward until said tacky material contacts the uppermost filter in said stack;

(B) ceasing to press said support downward, whereby said extractor returns to its original position with said uppermost filter adhering to said tacky material; and (C) removing said uppermost filter from said tacky material.

* * * * *